United States Patent
Bertz

(10) Patent No.: US 10,021,589 B2
(45) Date of Patent: Jul. 10, 2018

(54) WIRELESS DATA SYSTEM THAT ASSOCIATES INTERNET PROTOCOL PORTS WITH QUALITY-OF-SERVICE FOR USER APPLICATIONS

(71) Applicant: Sprint Communications Company L.P., Overland Park, KS (US)

(72) Inventor: Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 95 days.

(21) Appl. No.: 15/006,680

(22) Filed: Jan. 26, 2016

(65) Prior Publication Data

US 2017/0215101 A1    Jul. 27, 2017

(51) Int. Cl.
*H04L 1/00* (2006.01)
*H04W 28/02* (2009.01)
*H04W 28/00* (2009.01)
*H04W 80/04* (2009.01)
*H04L 12/24* (2006.01)

(52) U.S. Cl.
CPC ..... *H04W 28/0268* (2013.01); *H04L 41/5009* (2013.01); *H04W 28/00* (2013.01); *H04L 41/5019* (2013.01); *H04W 80/04* (2013.01)

(58) Field of Classification Search
None
See application file for complete search history.

(56) References Cited

U.S. PATENT DOCUMENTS

| | | | |
|---|---|---|---|
| 7,039,039 B2 | 5/2006 | Cheong et al. | |
| 7,185,070 B2 | 2/2007 | Paul et al. | |
| 8,264,958 B1* | 9/2012 | Pankajakshan | H04L 47/38 370/230.1 |
| 8,799,514 B1* | 8/2014 | Vautrin | G06F 9/5011 370/392 |

(Continued)

FOREIGN PATENT DOCUMENTS

| | | |
|---|---|---|
| WO | 2014096173 | 6/2014 |
| WO | 2014130143 | 8/2014 |
| WO | 2015094043 | 6/2015 |

OTHER PUBLICATIONS

Sun, China Telecom; M. Boucadair, France Telecom; S. Sivakumar, Cisco Systems; C. Zhou, Huawei Technologies; "Port Control Protocol (PCP) Extensioon for Port Set Allocation", Internet Engineering Task Forc, IEFT; StandardWorkingDraft, Internet Society (ISOC) 4 Rue Des Falaises Ch-1205, Geneva Switzerland, Nov. 20, 2013, pp. 1-17, XP015096240.

*Primary Examiner* — Minh-Trang Nguyen

(57) ABSTRACT

A communication system controls Quality-of-Service (QoS) using Internet Protocol (IP) address ports. A network controller identifies an IP port range and a QoS level for a user application. The network controller transfers port/QoS data that indicates the IP port range and the QoS level for the user application. A wireless relay and a network gateway receive the port/QoS data. The wireless relay wirelessly exchanges user data with User Equipment (UE) using an IP port in the IP port range. The wireless relay exchanges the user data with the network gateway using the QoS level associated with the IP port range responsive to the use of the IP port by the UE. The network gateway exchanges the user data using the QoS level associated with the IP port range responsive to the use of the IP port by the UE.

20 Claims, 10 Drawing Sheets

(56) References Cited

U.S. PATENT DOCUMENTS

| | | |
|---|---|---|
| 8,867,486 B2 | 10/2014 | Cherian et al. |
| 2004/0028035 A1* | 2/2004 | Read ................. H04L 29/06027 370/352 |
| 2012/0179830 A1* | 7/2012 | Ait-Ameur ........... H04L 67/125 709/228 |
| 2014/0148205 A1 | 5/2014 | Grinshpun et al. |
| 2014/0211714 A1 | 7/2014 | Li et al. |
| 2015/0063166 A1 | 3/2015 | Sif et al. |
| 2015/0334014 A1 | 11/2015 | Yerrapureddy et al. |
| 2015/0341309 A1 | 11/2015 | Babu et al. |
| 2016/0080316 A1* | 3/2016 | Gonzalez Pizarro ............... H04L 61/2507 709/245 |

* cited by examiner

PCRF DATA STRUCTURE 700

| APP ID | MEDIA TYPE | SUB-TYPE NAME | SUB-TYPE PREFIX | SUB-TYPE SUFFIX | PORT RANGE | QoS | ACCT ADDRESS | ACCT METRICS |
|---|---|---|---|---|---|---|---|---|
| SOCIAL NET A.1 | APP | XHTML+XML | VND.Z6 | DATA | 10-19 | QCI 9 | OCS.X.NET | A24 |
| SOCIAL NET A.2 | VIDEO | XHTML+XML | VND.Z6 | MPEG | 20-29 | QCI 2 | VID.COM | A56 |
| GOV NET1 | TEXT | XHTML+XML | PRS.G34 | FILE | 30-39 | QCI 8 | OCS.2.GOV | GOV224 |
| CORP NET1 | TEXT | XHTML+XML | PRS.A23 | FILE | 40-49 | QCI 9 | BANK.1.NET | NET4336 |
| VIDEO NET | VIDEO | MPEG | VND.VID | MPEG | 50-59 | QCI 8 | 123.12.1.1 | VID1034 |
| VOICE NET | AUDIO | G728 | X.FG4 | VOICE | 60-69 | QCI 1 | 123.12.1.1 | AUD1138 |
| GAMING NET | APP | JSON | VND.Z6 | DATA | 70-79 | QCI 3 | OCS.3.NET | D56 |
| EMERGENCY | TEXT | XML | VND.Z6 | DATA | 80-89 | QCI 5 | OCS.3.GOV | |
| HELP | TEXT | XHTML+XML | VND.Z6 | DATA | 90-99 | QCI 5 | | |
| SIGNALING | TEXT | XML | VND.Z6 | DATA | 100-110 | | | |
| DATA1 | TEXT | HTML | VND.G5 | | | | | |
| DATA2 | TEXT | HTML | | | | | | |
| DATA3 | TEXT | | | | | | | |
| DATA4 | | | | | | | | |

FIGURE 7

WIRELESS DATA SYSTEM THAT ASSOCIATES INTERNET PROTOCOL PORTS WITH QUALITY-OF-SERVICE FOR USER APPLICATIONS

TECHNICAL BACKGROUND

Data communication networks exchange user data between User Equipment (UE) like phones, computers, and machine transceivers. The user data might be audio/video, email, web content, software, or data files. The UEs execute software applications to generate and consume this user data. The UEs and the data communication networks use the Internet Protocol (IP) to transfer their user data.

IP networks use IP addresses and IP ports to route IP packets between UEs. For various reasons, these IP addresses and IP ports may be modified in transit. For example, a network gateway may translate the IP addresses and ports used inside its network to hide them from the public. In another example, a wireless relay may assign IP ports on the relay's IP address to attached UEs. Network Address and Port Translation (NAPT) is a general term for these type of tasks.

Quality-of-Service (QoS) for data communications entails characteristics like bit rate, latency, priority, and the like. Various techniques for delivering data QoS have been developed. Some IP networks mark IP packets with QoS indicators. Virtual Private Networks (VPNs) may deliver IP QoS by IP address and port over a closed and controlled IP network. Unfortunately, the use of IP addresses and ports to deliver QoS is often frustrated by the many NAPT modifications. Thus, some IP networks deliver data QoS over the underlying layer 2 data tunnels. A prime example are wireless IP networks where a wireless relay and a network gateway both perform NAPT tasks and QoS is delivered over layer 2.

The Port Control Protocol (PCP) allows IP hosts (including UEs) to manage their NAPT data in the NAPT devices. For example, a UE may add, modify, and delete its NAPT translations in a network gateway by using PCP messages. Unfortunately, PCP does not have the functionality efficiently deliver data QoS. Moreover, PCP does not effectively facilitate QoS in a NAPT scenario with a cascade of IP address and port translations.

TECHNICAL OVERVIEW

A communication system controls Quality-of-Service (QoS) using Internet Protocol (IP) address ports. A network controller identifies an IP port range and a QoS level for a user application. The network controller transfers port/QoS data that indicates the IP port range and the QoS level for the user application. A wireless relay and a network gateway receive the port/QoS data. The wireless relay wirelessly exchanges user data with User Equipment (UE) using an IP port in the IP port range. The wireless relay exchanges the user data with the network gateway using the QoS level associated with the IP port range responsive to the use of the IP port by the UE. The network gateway exchanges the user data using the QoS level associated with the IP port range responsive to the use of the IP port by the UE.

DESCRIPTION OF THE DRAWINGS

FIG. 7 illustrates a Policy and Charging Rules Function (PCRF) data structure to associate QoS with IP ports.

DETAILED DESCRIPTION

Figure 1:
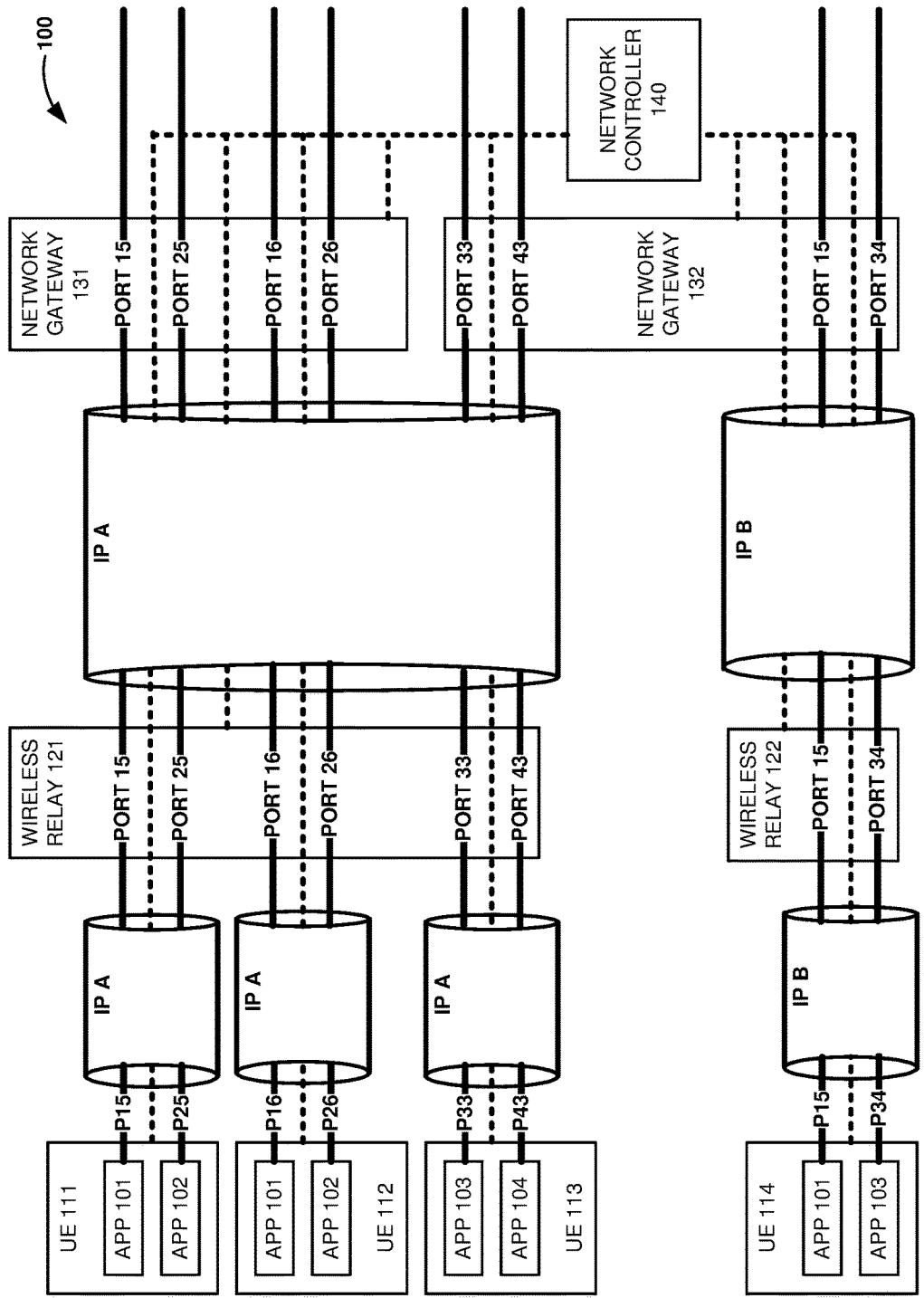
FIG. 1 illustrates a data communication network that associates Quality-of-Service (QoS) with Internet Protocol (IP) ports.

FIG. 1 illustrates data communication network 100 that associates Quality-of-Service (QoS) with Internet Protocol (IP) ports. Data communication network 100 comprises User Equipment (UE) 111-114, wireless relays 121-122, network gateways 131-132, and network controller 140. UEs 111-114 include applications 101-104 that comprise software modules for audio/video, messaging, data transfers, or some other data service. Exemplary applications include modules for news and weather, media streaming, social networking, video conferencing, web searching, and the like.

To service applications 101-104, UEs 101-114 exchange user data over IP connections. On FIG. 1, the IP connections are depicted by tunnels that represent IP addresses A and B for respective wireless relays 121-122. The IP connections are further depicted by lines that represent IP ports 15, 16, 25, 26, 33, 34, and 43 as associated with IP address A and IP address B. Note that these addresses and ports are merely representative for illustrative purposes. The IP ports are associated with QoS levels that specify parameters like bite rate, latency, priority, and/or some other networking characteristic. Note that the IP addresses and ports may be translated by network gateways 131-131 for the data flows on the far right side of FIG. 1, but these translations are omitted for clarity.

UEs 101-114 and wireless relays 121-122 exchange the user data over the IP connections using QoS levels that are associated with applications 101-104 and with respective IP ports. For example, UE 111 and wireless relay 121 may use QoS Class Identifier (QCI) 1 for data exchanges over port 25, and they would also use port 25 for application 102.

Wireless relays 121-122 and network gateways 131-132 exchange the user data over the IP connections using the QoS levels that are associated with the respective IP ports. For example, wireless relay 121 and network gateway 131 may use QCI 9 for data exchanges over port 15 for application 101. Network gateways 131-132 exchange the user data with various other systems over IP connections using the QoS levels for the respective IP ports. For example, network gateway 131 may use QCI 9 for port 15 (application 101) and QCI 1 for port 25 (application 102). In addition to QCIs, other QoS control data may be used such as Differentiated Services marks, Proxy Mobile Internet Protocol (PMIP) context, and the like.

Network controller 140 is configured with port/QoS data that associates applications 101-104 with respective IP ports and QoS levels. Network controller 140 then exchanges control signaling (dotted lines) with UEs 111-114, wireless relays 121-122, and network gateways 131-132 to distribute the port/QoS data. Network controller 140 may push the port/QoS data and/or respond to data requests from UEs 111-114, wireless relays 121-122, and/or network gateways 131-132.

In some examples, UEs 111-114 and wireless relays 121-122 discover and report applications 101-104 to network controller 140 responsive to wireless device attachment, and network controller 140 serves back the port/QoS data for applications 101-104. In other examples, UEs 111-114 and wireless relays 121-122 discover and report applications 101-104 responsive to an application data flow, and network controller 140 serves back the port/QoS data for the flowing one of applications 101-104.

Wireless relays 121-122 and UEs 111-114 may transfer Port Control Protocol (PCP) requests to a PCP server in network controller 140 to obtain the IP port ranges for individual applications 101-104. In turn, the PCP server may generate and transfer network requests to a Policy Charging Rules Function (PCRF) for the QoS levels for individual applications 101-104. The PCRF implements the QoS levels for applications 101-104 over the port ranges.

In some examples, wireless relays 121-122 and UEs 111-114 also discover and report application IDs and media types for applications 101-104 to network controller 140 in the port/QoS data requests. Network controller 140 would be further configured to associate applications 101-104 with ports/QoS based on their respective media types and IDs. For example, network controller 140 may associate application 103 with ports 30-39 and a PMIPv6 video QoS based on the application's VIDEO media type and/or its video Uniform Resource Indicator (URI).

Network controller 140 selects Policy Charging Enforcement Functions (PCEFs) in wireless relays 121-122 for applications 101-104. For example, network controller 140 may select a voice PCEF in wireless relay 121 to handle application 102 and it's QCI 1 over port 25. Network controller 140 transfers the port/QoS data to the selected PCEFs in wireless relays 121-122. Network controller 140 also selects PCEFs in network gateways 131-132 for applications 101-104. For example, network controller 140 may select a video PCEF in network gateway 132 to handle application 103 and it's QCI 3 over port 33. Network controller 140 transfers the port/QoS data to the selected PCEFs in network gateways 131-132. Network controller 140 may also select PCEFs in UEs 111-114 for applications 101-104. For example, network controller 140 may select a data PCEF in UE 114 to handle application 101 and it's QCI 9 over port 15.

Responsive to the port/QoS data from network controller 140, the PCEFs in UEs 111-114, wireless relays 121-122, and network gateways 131-132 generate and transfer usage metrics for the application data exchanges over the IP ports. For example, the PCEF in wireless relay 121 may measure and transfer bit rate, latency, retry, and other performance metrics for the QCI 1 over port 25 for application 102. The PCEF in network gateway 132 may provide bit rate, latency, retry, and other performance metrics for the QCI 3 over port 34 for application 103. The PCEF in UE 114 may provide bit rate, latency, retry, and other performance metrics for the QCI 9 over port 15 for application 101.

UEs 111-114 and wireless relays 121-122 comprise phones, computers, machine transceivers, and/or some other wireless communication devices-including combinations thereof. Network gateways 131-132 comprise computer equipment, storage systems, and software to route IP packets. In some examples, network gateways 131-132 comprise LTE Packet Data Network Gateways (P-GWs) that are configured with PMIP Local Mobility Anchors (LMAs). Network controller 140 comprises computer equipment, storage systems, and software to control IP packet handling. In some examples, network controller 140 comprises LTE Mobility Management Entities (MMEs) and Policy, Charging, Rules Functions (PCRFs). The data and control links use media such as air, metal, and/or glass, and may include intermediate data devices, systems, and networks. These links use protocols like Long Term Evolution (LTE), Proxy Mobile Internet Protocol (PMIP), Wireless Fidelity (WiFi), Wave Division Multiplexing (WDM), Ethernet, and/or some other data communication format-including combinations thereof.

Figure 2:
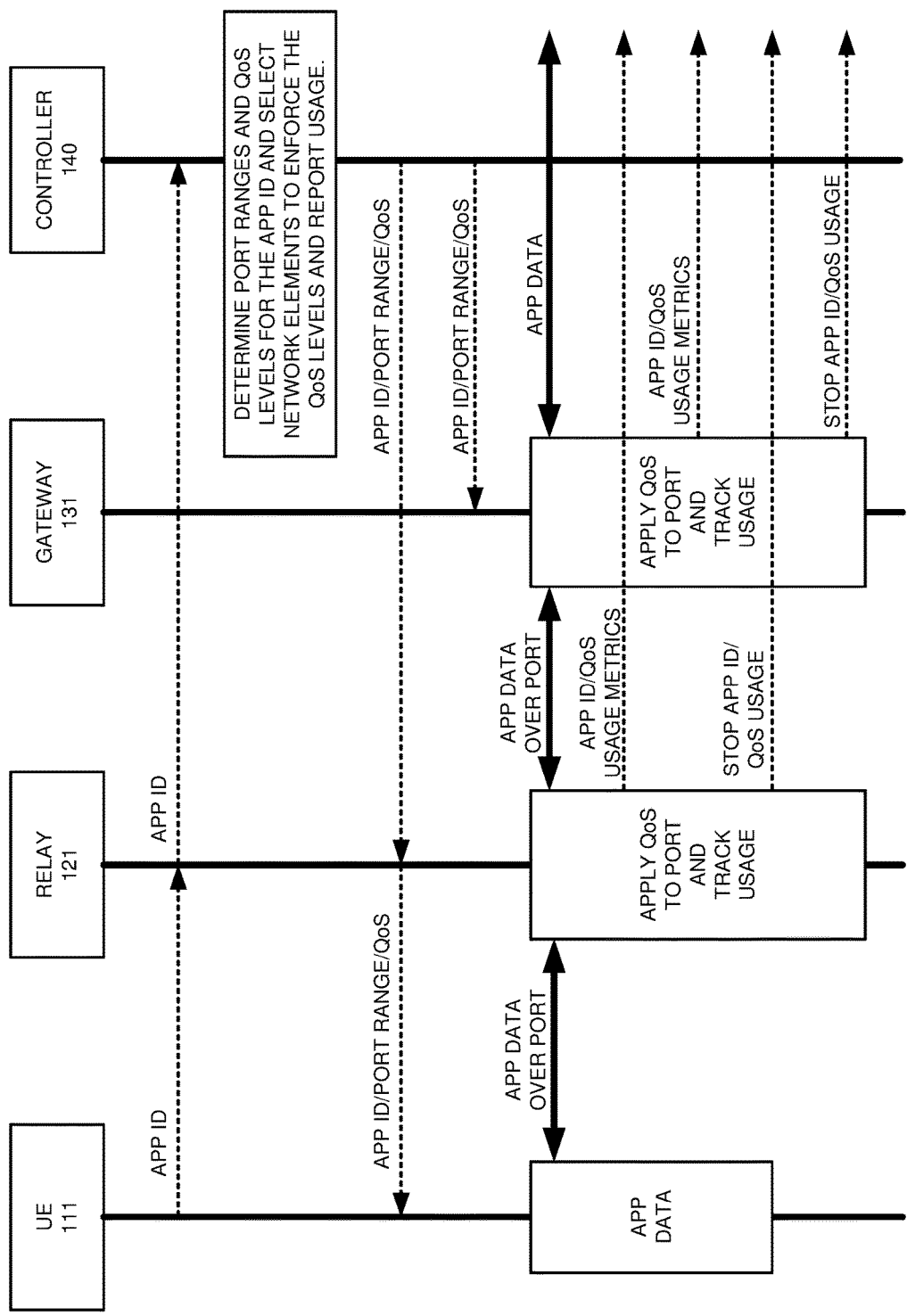
FIG. 2 illustrates the operation of the data communication network to associate QoS with IP ports.

FIG. 2 illustrates the operation of data communication network 100 to associate QoS with IP ports. UE 111 transfers an application ID to wireless relay 111. The application ID transfer may occur during device attachment, an application discovery session, or the data flow itself. Wireless relay 111 transfers the application ID to network controller 131. Wireless relay 111 may use a PCP request for the application ID transfer.

Network controller translates the application ID into one or more IP port ranges and corresponding QoS levels. In the present example, a voice application ID would be translated into a port range of 20-29 and a QoS of QCI 1. Network controller 140 selects wireless relay 121 and network gateway 131 to enforce the QoS levels over the IP ports and to report on port/QoS usage. Note that network controller 140 may select a different wireless relay or access system than relay 121 based on UE 111 network connectivity options. Network controller 140 may prioritize a set of wireless relays, base stations, and access systems for selection by UE 111.

In this example, network controller 140 responds to wireless relay 111 with the IP port ranges and corresponding QoS levels for the application ID. Wireless relay 111 transfers the IP port ranges and corresponding QoS levels for the application ID to UE 111. These responses typically indicate the ID or address for network gateway 131. These responses may be PCP responses to the PCP requests mentioned above. Network controller 140 also transfers the IP port ranges and corresponding QoS levels for the application ID to network gateway 121.

UE 111 and wireless relay 121 then exchange user data over an IP port using the QoS associated with the IP port range for that port. Wireless relay 121 and network gateway 131 exchange the user data over the IP port using the QoS for the associated port range. Network gateway 131 exchanges the user data using the QoS for the associated port range, although network gateway 131 may perform Network Address and Port Translation (NAPT) functions that alter the IP port on the network side of gateway 131. On subsequent data sessions for the application, UE 111, wireless relay 121, and network gateway 131 exchange user data over the designated IP port using the assigned QoS without repeating the entire port/QoS process above.

Wireless relay 121 and network gateway 131 track the data usage over the IP port to generate usage metrics. The usage metrics comprise IP port, QoS level, start time, stop times, total bytes, bit rate, latency, errors, and/or some other networking data measure. Wireless relay 121 and network gateway 131 transfer the usage metrics for the port range to a network data system (not shown) and eventually transfer data stop indications for the port range. Although not shown for clarity, UE 111 may also track and report the data usage over the IP port range in response to the port/QoS data from network controller 140. The port/QoS data from network controller 140 may include instructions for tracking and reporting the data usage over the IP port range including tracking metrics, reporting format, and network destinations for the usage data.

Figure 3:
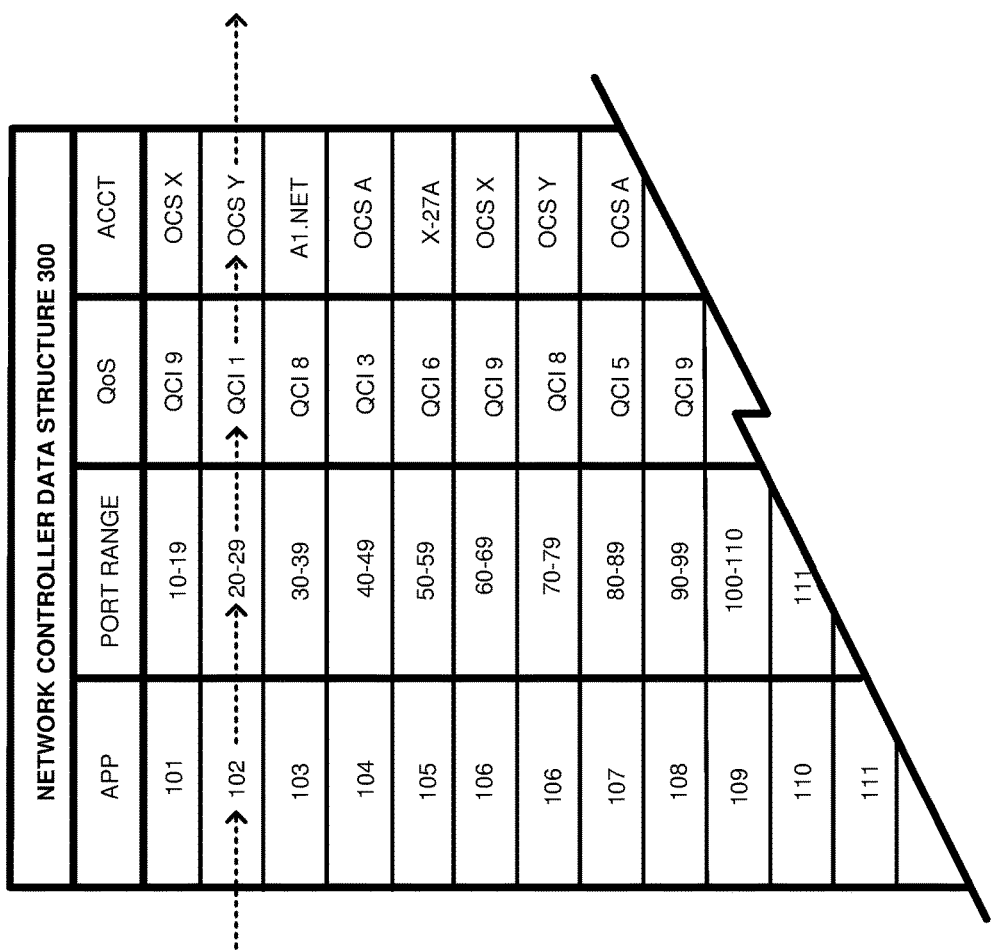
FIG. 3 illustrates a data structure for a network controller to associate QoS with IP ports.

FIG. 3 illustrates data structure 300 for network controller 140 to associate QoS with IP ports. Data structure 300 is representative and may vary in form. The port ranges are also representative and will typically be larger and more varied. Data structure 300 comprises columns for application, port range, QoS, and accounting (ACCT). Network controller 140 enters data structure 300 with the application ID and matriculates from the port range through the QoS level and to the ACCT instruction. For application ID 102, the associated port range is 20-29, the associated QoS level is QCI 1, and the ACCT instruction is to use Online Charging System (OCS) Y.

Figure 4:
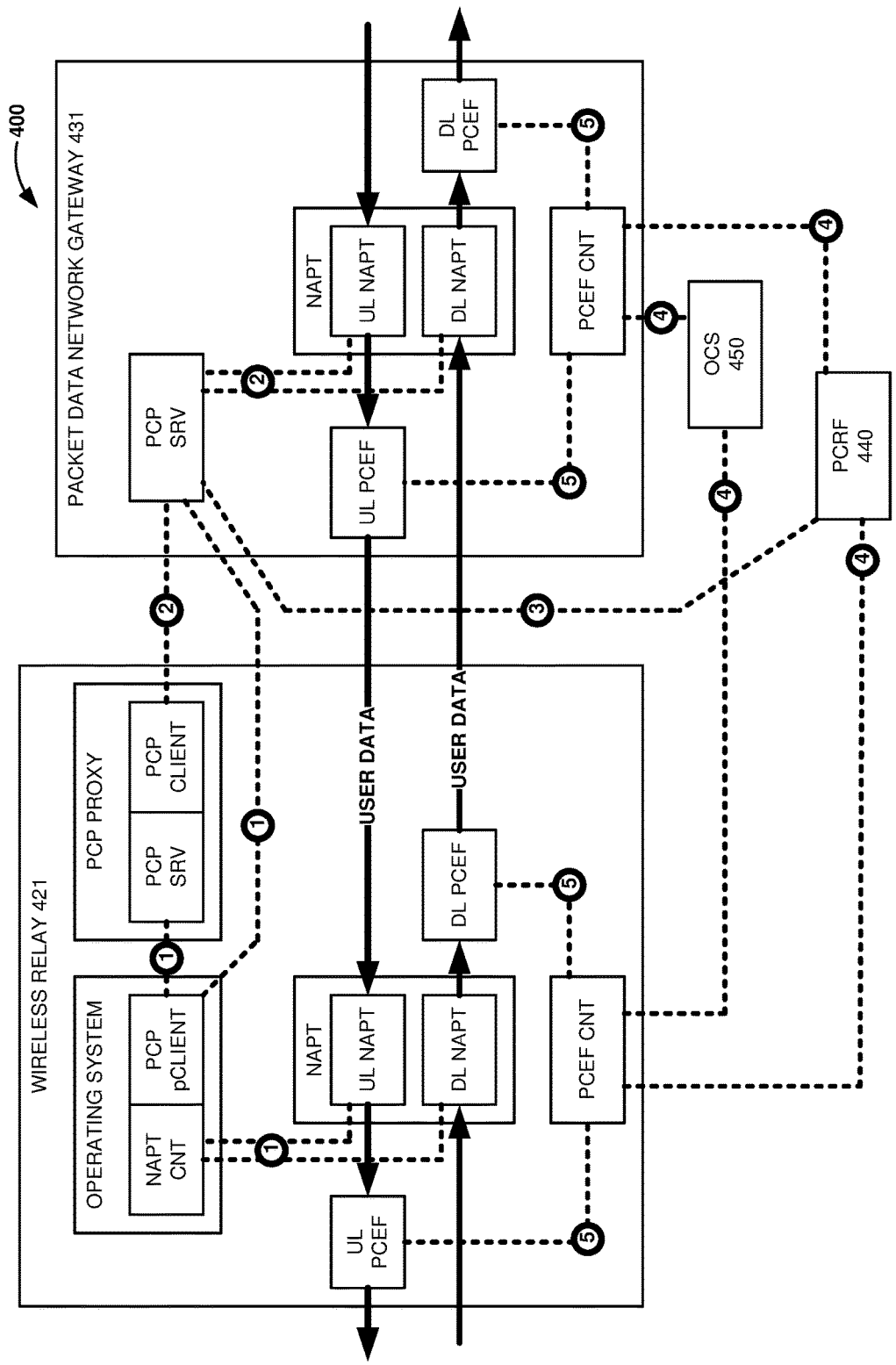
FIG. 4 illustrates a Long Term Evolution (LTE) system to associate QoS with IP ports.

FIG. 4 illustrates Long Term Evolution (LTE) system 400 that associate QoS with IP ports. LTE system 400 is an example of data communication system 100, although system 100 may vary from this example. LTE system 400 comprises wireless relay 421, Packet Data Network Gateway (P-GW) 431, Policy and Charging Rules Function (PCRF) 440, and Online Charging System (OCS) 450. For clarity, LTE systems like eNodeBs, Serving Gateways, and Mobility Management Entities (MMEs) are not shown but would typically be present and operate in their standard manner.

Wireless relay 421 comprises an operating system, PCP proxy, Network Address and Port Translation (NAPT), Uplink (UL) and Downlink (DL) Policy and Charging Enforcement Functions (PCEFs), and a PCEF controller. P-GW 431 comprises a PCP server, NAPT, UL/DL PCEFs, and a PCEF controller. In wireless relay 421, the operating system includes a NAPT controller and a PCP pseudo-Client (pClient). The PCP proxy comprises a PCP server (SRV) and a PCP client. The NAPT comprises UL and DL NAPT components. In P-GW 431, the NAPT comprises UL and DL NAPT components. The user data links are depicted by solid heavy lines through the PCEFs and NAPTs in both the UL and DL directions. The user data links are typically both wireless and wireline and use LTE and/or PMIPv6.

A first set of control links (dotted lines) enable the NAPT in wireless relay 421 to communicate with the NAPT controller in the relay's operating system. The first set of control links also enable the pClient in the relay's operating system to communicate with the PCP servers in wireless relay 421 and P-GW 431. The first set of control links are typically operating system Application Programming Interface (API) calls. A second set of control links enable the PCP server in P-GW 431 to communicate with its NAPT and with the PCP client in wireless relay 421. The second set of control links are typically PCP message exchanges.

A third control link is between PCRF 440 and the PCP server in P-GW 431. This PCRF/PCP link might use PCP, Diameter, and/or some other data protocol. The PCRF/PCP link transfers application IDs from the PCP server to PCRF 440. PCRF 440 processes the application IDs to drive the PCEF controllers. A fourth set of control links enable PCRF 440 to transfer port/QoS data to the PCEF controllers in wireless relay 421 and P-GW 431. The fourth set of control links also enable the PCEF controllers to transfer port usage metrics to OCS 450. The fourth set of control links are typically Diameter links. In relay 421 and P-GW 431, the PCEF controllers drive the UL/DL PCEFs to deliver per-port QoS and report usage responsive to the port/QoS data. A fifth set of control links between the PCEF controllers and the PCEFs may comprise intra-machine messaging or some other data protocol.

Figure 5:
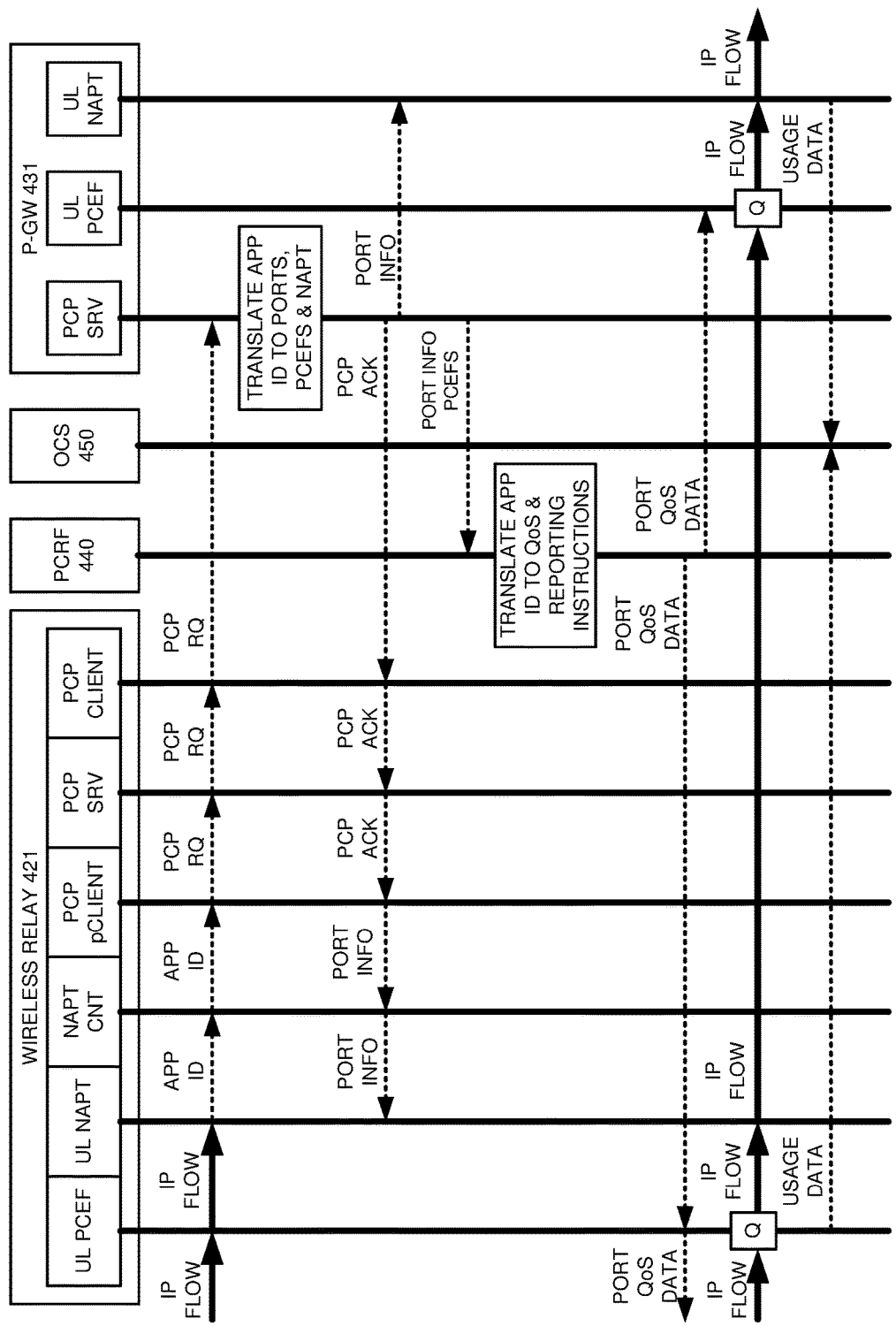
FIG. 5 illustrates the operation of the LTE system to associate QoS with IP ports.

FIG. 5 illustrates the operation of LTE system 400 to associate QoS with IP ports. In wireless relay 421, the UL PCEF receives an IP flow from a user device. The IP flow has the source IP address of relay 421, a port for the user device, and an application ID. The UL PCEF forwards the IP flow to the UL NAPT. The UL NAPT may derive the app ID from an application signature in the IP flow if the app ID is not present. For example, the UL NAPT may detect a social network URI in the IP flow.

Without current port/QoS information, the UL NAPT invokes the NAPT controller in the relay operating system over its API. The NAPT controller transfers the app ID and UL NAPT for the new IP flow to the PCP pClient. The PCP pClient emulates the PCP client in a user device. The PCP pClient transfers the app ID and UL NAPT for the new IP flow in a PCP request to the PCP server, and the PCP server transfers the app ID and UL NAPT for the new IP flow in a PCP request to the PCP client. The PCP client in relay 421 transfers the app ID and UL NAPT for the new IP flow in a PCP request to the PCP server in P-GW 431.

The PCP server in P-GW 431 processes the application ID and UL NAPT in the PCP request to select an IP port range, UL PCEFs, and another UL NAPT. The PCP server in P-GW 431 returns a PCP acknowledgement (ACK) to the PCP client in relay 421 with the application ID, IP address, and IP port range. The PCP client transfers the PCP ACK to the relay PCP server which passes the PCP ACK to the PCP pClient. The pClient transfers port information to the NAPT controller indicating the application ID, IP address, and IP port range. The NAPT controller transfers the port information to the UL NAPT component in relay 421. The PCP server in P-GW 431 also transfers a PCP message to the selected UL NAPT component in P-GW 431 with the application ID, IP address, IP port range, along with the external IP address and port.

In response to the PCP request, the PCP server in P-GW 431 transfers a Diameter message to PCRF 440 with the application ID, IP address, IP port range, and the UL PCEFs. PCRF 440 translates the app ID into a QCI and usage reporting instructions. PCRF 440 transfers port/QoS data to the selected UL PCEFs indicating the app ID, IP address, port range, QCI, and usage reporting instructions. In wireless relay 421, the UL PCEF transfers the port/QoS data to the user device indicating a port in the port range for that user device/application/QoS combination.

The UL PCEF in wireless relay now receives the UL IP flow from the user device with the assigned IP port. Responsive to the IP port, the UL PCEF in relay 421 applies the PCRF-selected QCI to the IP flow and generates usage data for the IP flow. The UL PCEF in relay 421 transfers the usage data for the IP flow to OCS 450 per the reporting instructions. The UL NAPT transfers the IP flow to The UL PCEF in P-GW 431. Responsive to the IP port, the UL PCEF in P-GW 431 applies the PCRF-selected QCI to the IP flow and generates usage data for the IP flow. The UL NAPT in P-GW 431 typically performs NAPT functions on the IP flow before exchange with external systems like the Internet. The UL PCEF in P-GW 431 transfers the usage data for the IP flow to OCS 450 per the reporting instructions.

Figure 6:
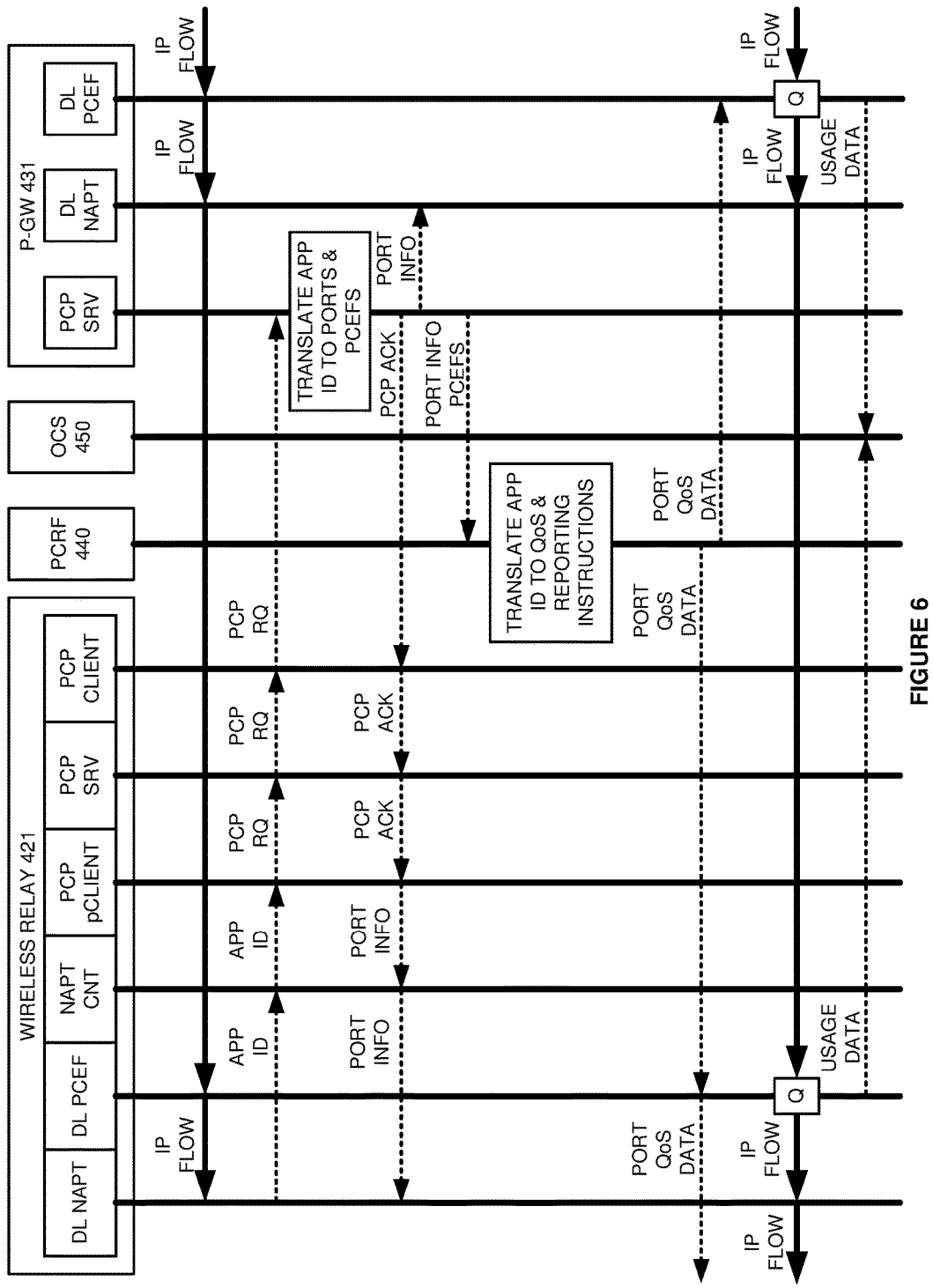
FIG. 6 illustrates the operation of the LTE system to associate QoS with IP ports.

FIG. 6 illustrates the operation of LTE system 400 to associate QoS with IP ports. In P-GW 431, the DL PCEF receives an IP flow from an external system like the Internet. The DL PCEF transfers the IP flow to the DL NAPT to perform translations. The DL NAPT transfers the IP flow to the DL PCEF in wireless relay 421. The DL PCEF transfers the IP flow to the DL NAPT in relay 421. The IP flow has the destination IP address of relay 421, a port for the destination user device, and possibly an application ID. Without current port/QoS information, the DL NAPT initiates the port/QoS process. If no application ID is present, the DL NAPT may derive the application ID based on signatures in the header or payload. For example, the DL NAPT may detect a video URI in a header or video data formatting in the payload.

The DL NAPT in relay 421 invokes the NAPT controller in the relay operating system over its API. The NAPT controller transfers the app ID and DL NAPT for the new IP flow to the PCP pClient. The PCP pClient emulates the PCP client in a user device. The PCP pClient transfers the app ID and DL NAPT for the new IP flow in a PCP request to the PCP server, and the PCP server transfers the app ID and DL NAPT for the new IP flow in a PCP request to the PCP client. The PCP client in relay 421 transfers the app ID and DL NAPT for the new IP flow in a PCP request to the PCP server in P-GW 431.

The PCP server in P-GW 431 processes the application ID and DL NAPT in the PCP request to select an IP port range and DL PCEFs, and to identify the DL NAPT in P-GW 431. The PCP server in P-GW 431 returns a PCP ACK to the PCP client in relay 421 with the application ID, IP address, and IP port range. The PCP client transfers the PCP ACK to the relay PCP server which passes the PCP ACK to the PCP pClient. The pClient transfers port information to the NAPT controller indicating the application ID, IP address, and IP port range. The NAPT controller transfers the port information to the DL NAPT component in relay 421. The PCP server in P-GW 431 also transfers a PCP message to the identified DL NAPT component in P-GW 431 with port information including the application ID, IP address, and IP port range.

In response to the PCP request, the PCP server in P-GW 431 transfers a Diameter message to PCRF 440 with port information like the application ID, IP address, IP port range, DL PCEFs, and the external IP address and port. PCRF 440 translates the app ID into a QCI and usage reporting instructions. PCRF 440 transfers port/QoS data to the selected DL PCEFs indicating the app ID, IP address, port range, QCI, usage reporting instructions, and the external IP address and port. In wireless relay 421, the DL PCEF transfers the port/QoS data to the user device indicating a port in the port range for that user device/application/QoS combination.

The DL PCEF in P-GW 431 receives the IP flow from the external system with the external IP address and port associated with relay 421 and the user device. Due to the downstream translation of the external IP address/port to the assigned IP address and IP port in the DL NAPT, the DL PCEF identifies the QoS and reporting instructions from the port/QoS data. The DL PCEF applies the PCRF-selected QCI to the IP flow and generates usage data for the IP flow. The DL PCEF transfers the IP flow to the DL NAPT which translates the external destination IP address and port to the IP address of relay 421 and the port associated with the application ID and its QoS level. The DL NAPT in P-GW 431 transfers the IP flow to the DL PCEF in wireless relay 431.

Responsive to the IP address and port, the DL PCEF in relay 431 applies the PCRF-selected QCI to the IP flow and generates usage data for the IP flow. The DL PCEF transfers the IP flow to the DL NAPT which transfers the IP flow to the user device. The DL PCEFs in relay 421 and P-GW 431 transfer their usage data for the IP flow to OCS 450 per the reporting instructions.

FIG. 7 illustrates PCRF data structure 700 to associate QoS with applications through IP ports. Data structure 700 is representative and may vary in form. The port ranges are also representative and will typically be larger and more varied. Data structure 700 comprises columns for application, media type, sub-type name, sub-type prefix (or tree), subtype suffix, port range, QoS, accounting address, and accounting metrics. PCRF 440 enters data structure 700 with the application ID and matriculates through media types, sub-type names, and sub-type prefixes to identify the port range and QCI. In this manner, application IDs may be characterized by media type and sub-type, and the desired ports/QCIs are identified based on the specific media types and sub-types. Likewise, the accounting address and tracking metrics may be associated with specific application IDs or with specific media types and sub-types. Various combinations of application ID, media type data, and media subtype data could be used in data structure 700 to point to the desired port ranges, QCIs, and accounting instructions.

Figure 8:
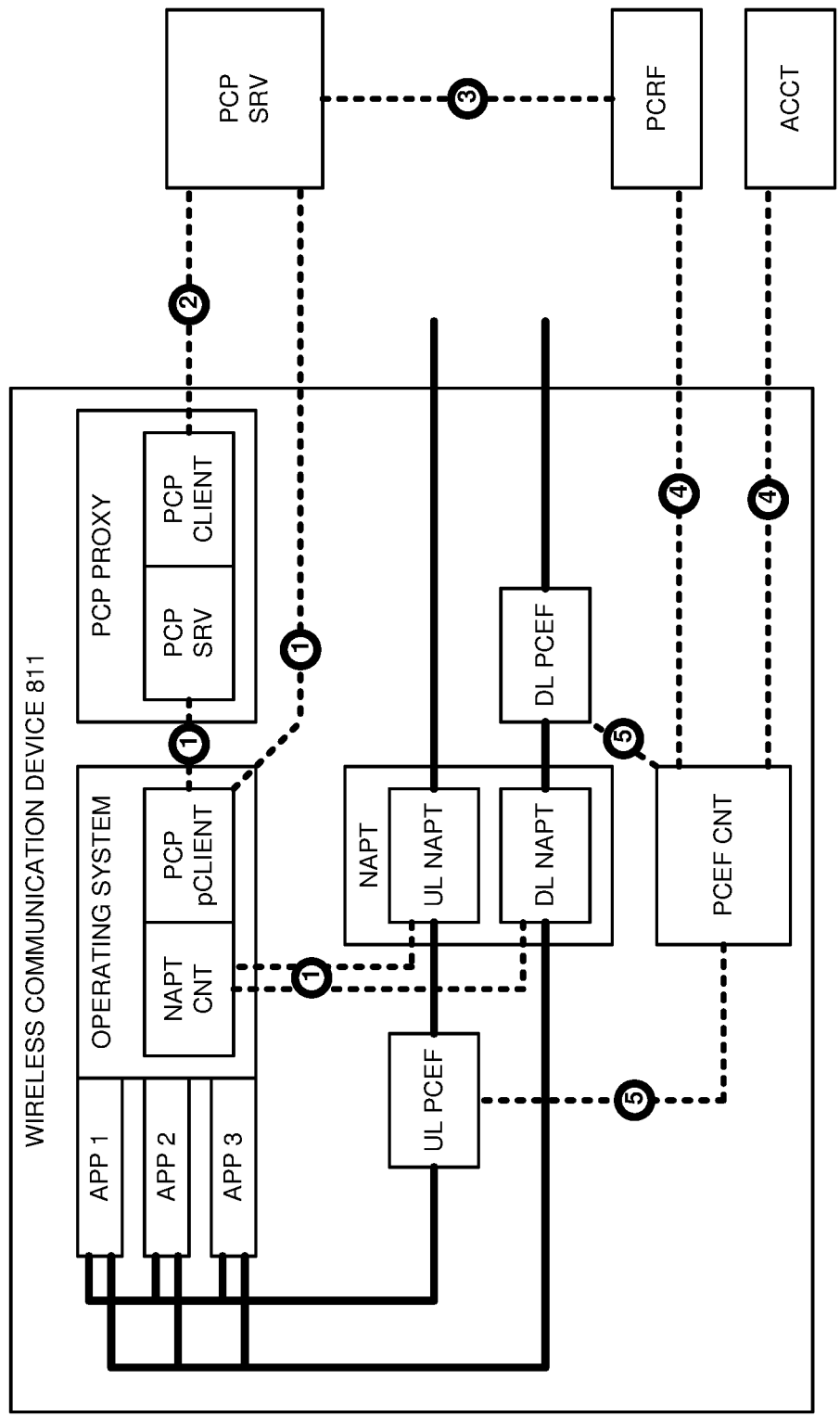
FIG. 8 illustrates a wireless communication device to associate QoS with IP ports.

FIG. 8 illustrates wireless communication device 811 to associate QoS with IP ports. Wireless communication device 811 comprises applications 1-3, operating system, PCP proxy, NAPT, UL and DL PCEFs, and a PCEF controller. The operating system includes a NAPT controller and a PCP pseudo-Client (pClient). The PCP proxy comprises a PCP server (SRV) and a PCP client. The NAPT comprises UL and DL NAPT components. The user data links are depicted by solid heavy lines from applications 1-3 through the PCEFs and NAPTs in both the UL and DL directions. The user data links are typically wireless links that use LTE and PMIP.

A first set of control links (dotted lines) enable the NAPT in wireless device 811 to communicate with the NAPT controller in the device's operating system. The first set of control links also enable the pClient in the device's operating system to communicate with the PCP servers in wireless device 811 and external P-GWs. The first set of control links are typically operating system API calls. A second control link enables the PCP servers in the P-GWs to communicate with the PCP client in the PCP proxy in wireless device 811. The second control link comprises PCP message exchanges. The third control link is shown between the P-GW PCP server and the PCRF. The third control link might be a Diameter that transfers application IDs, port ranges, and PCEF IDs.

A fourth set of control links enable the PCRF to transfer port/QoS data to the PCEF controller in wireless device 811. The fourth set of control links also enable the PCEF controller to transfer port usage metrics to accounting. The fourth set of control links are typically Diameter links. A fifth set of control links enable the PCEF controller to drive the UL/DL PCEFs to deliver per-port QoS and to track and report their usage responsive to the port/QoS data. The fifth set of control links may comprise intra-machine messaging or some other data protocol.

The operations depicted in FIGS. 5-6 for wireless relay 421 also apply to wireless communication device 811. Thus, wireless communication device 811 exchanges IP flows and PCP messaging with P-GWs. Wireless communication device 811 exchanges port/QoS with the PCRF and exchanges usage data with accounting. Wireless communication device 811 applies per-port QoS and reporting as directed by the PCRF.

Figure 9:
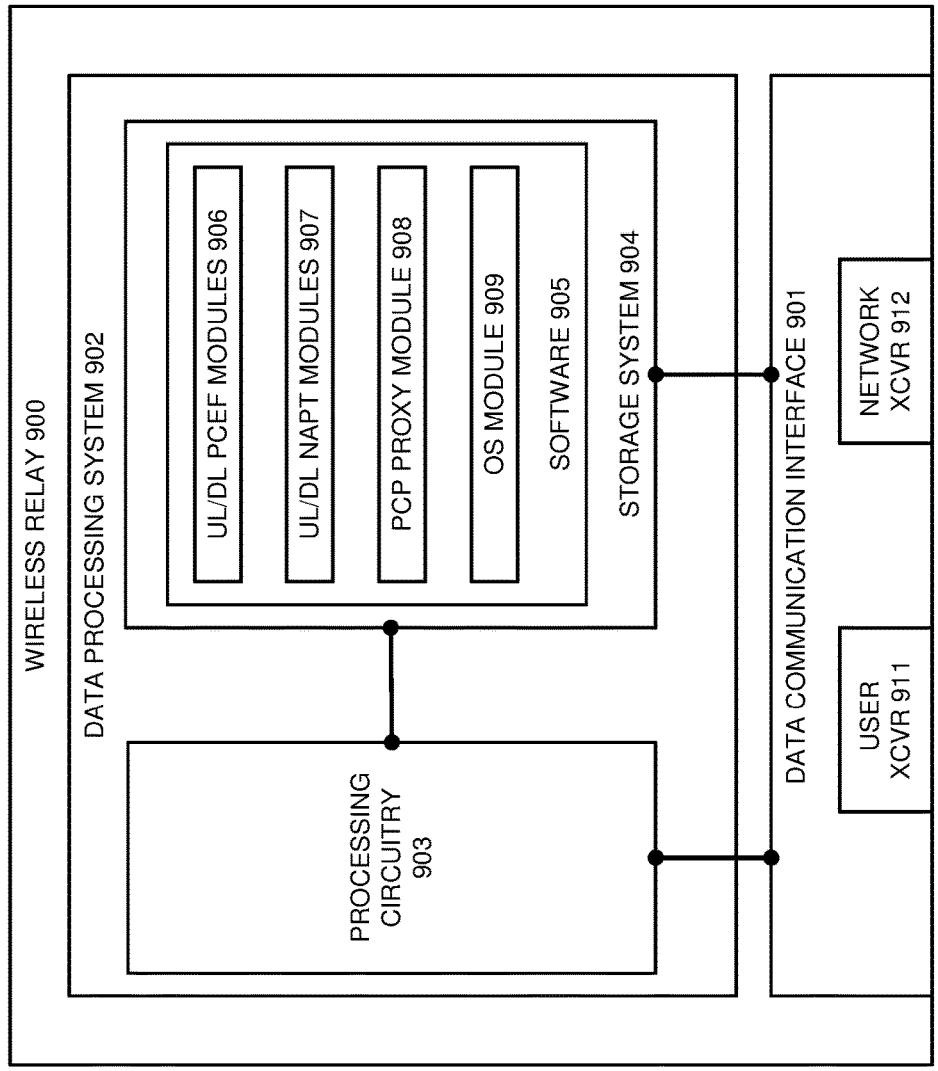
FIG. 9 illustrates a wireless relay to associate QoS with IP ports.

FIG. 9 illustrates wireless relay 900 to associate QoS with IP ports. Wireless relay 900 is an example of relays 121-122 and 421, although these relays may use alternative configurations and operations. Wireless relay 900 comprises data communication interface 901 and data processing system 902. Data communication interface 901 comprises user transceiver 911 and network transceiver 912. Data processing system 902 comprises processing circuitry 903 and storage system 904. Storage system 904 stores software 905. Software 905 includes respective software modules 906-909. Some conventional aspects of wireless relay 900 are omitted for clarity, such as power supplies, enclosures, and the like. Wireless relay 900 may be centralized or distributed.

In data communication interface 901, transceivers 911-912 comprise communication components, such as ports, bus interfaces, signal processors, memory, software, and the like. In data processing system 902, processing circuitry 903 comprises circuit boards, bus interfaces, integrated circuitry, and associated electronics. Processing circuitry 903 comprises Central Processing Units (CPUs) with associated cache and bus structures. The CPUs comprise transistors, registers, signal media, and substrate. Storage system 904 comprises non-transitory, machine-readable, data storage media, such as flash drives, disc drives, memory circuitry, servers, and the like.

Software 905 comprises machine-readable instructions that control the operation of processing circuitry 903 when executed. Software 905 includes software modules 906-909 and may also include operating systems, hypervisors, applications, data structures, virtual network elements, utilities, and the like. All or portions of software 906-909 may be externally stored on one or more storage media, such as circuitry, discs, and the like.

When executed by processing circuitry 903, UL/DL PCEF modules 906 direct circuitry 903 to implement port/QoS data and report usage as directed. When executed by processing circuitry 903, UL/DL NAPT modules 907 direct circuitry 903 to perform NAPT functions and transfer IP flows in the designated port ranges. When executed by processing circuitry 903, PCP proxy module 908 directs circuitry 903 to exchange PCP messages with a PCP server to obtain application/port assignments and to initiate QoS and reporting. When executed by processing circuitry 903, Operating System (OS) module 909 directs circuitry 903 to interface between the NAPT modules 907 and the PCP proxy module 908.

Figure 10:
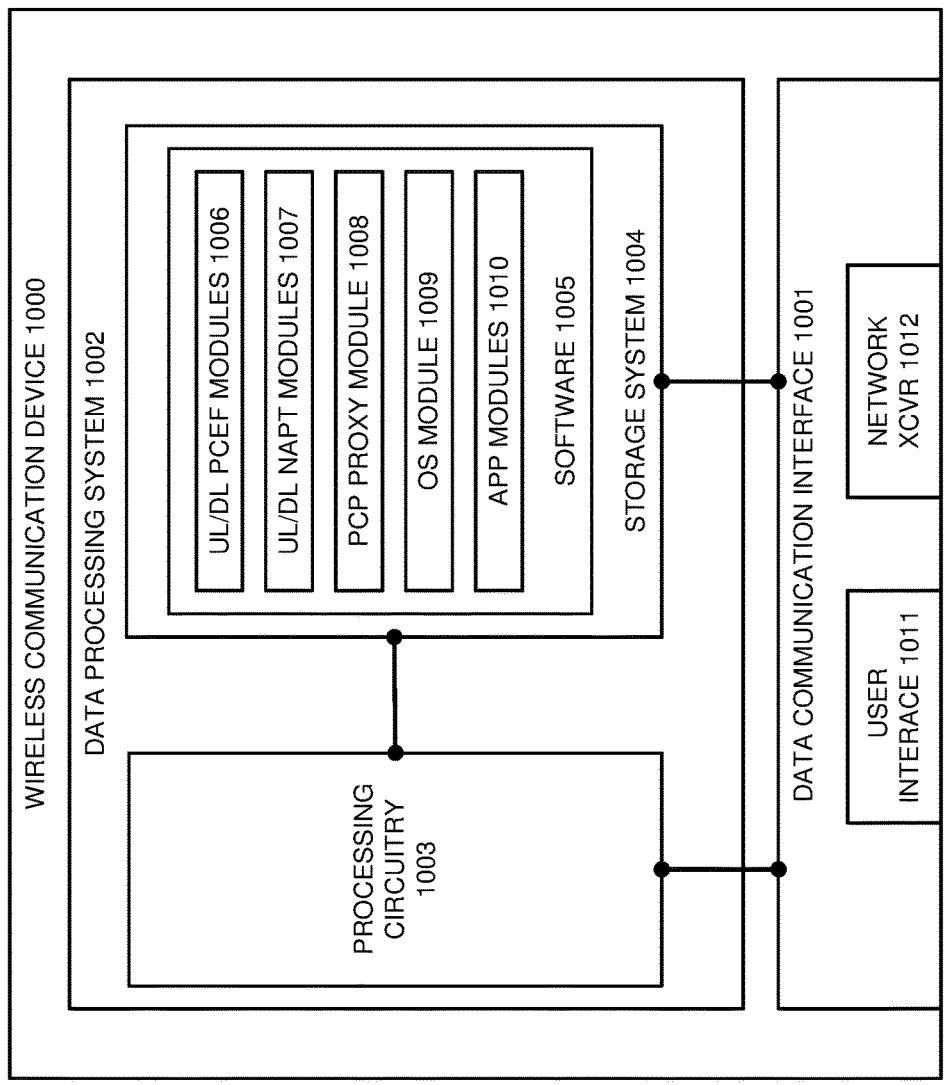
FIG. 10 illustrates a wireless communication device to associate QoS with IP ports.

FIG. 10 illustrates wireless communication device 1000 to associate QoS with IP ports. Wireless communication device 1000 is an example of devices 111-114, although these devices may use alternative configurations and operations. Wireless communication device 1000 comprises data communication interface 1001 and data processing system 1002. Data communication interface 1001 comprises user interface 1011 and network transceiver 1012. Data processing system 1002 comprises processing circuitry 1003 and storage system 1004. Storage system 1004 stores software 1005. Software 1005 includes respective software modules 1006-1010. Some conventional aspects of wireless communication device 1000 are omitted for clarity, such as power supplies, enclosures, and the like. Wireless communication device 1000 may be centralized or distributed.

In data communication interface 1001, user interface 1011 comprises displays, touchscreens, microphones, speakers, buttons, and the like. Network transceiver 1012 comprises communication ports, bus interfaces, signal processors, memory, software, and the like. In data processing system 1002, processing circuitry 1003 comprises circuit boards, bus interfaces, integrated circuitry, and associated electronics. Processing circuitry 1003 comprises CPUs with associated cache and bus structures. The CPUs comprise transistors, registers, signal media, and substrate. Storage system 1004 comprises non-transitory, machine-readable, data storage media, such as flash drives, disc drives, memory circuitry, servers, and the like.

Software 1005 comprises machine-readable instructions that control the operation of processing circuitry 1003 when executed. Software 1005 includes software modules 1006-1010 and may also include operating systems, hypervisors, applications, data structures, virtual network elements, utilities, and the like. All or portions of software 1006-1010 may be externally stored on one or more storage media, such as circuitry, discs, and the like.

When executed by processing circuitry 1003, UL/DL PCEF modules 1006 direct circuitry 1003 to implement port/QoS data and report usage as directed. When executed by processing circuitry 1003, UL/DL NAPT modules 1007 direct circuitry 1003 to perform NAPT functions and transfer IP flows in the designated port ranges. When executed by processing circuitry 1003, PCP proxy module 1008 directs circuitry 1003 to exchange PCP messages with a PCP server to obtain application/port assignments and to initiate QoS and reporting. When executed by processing circuitry 1003, OS module 1009 directs circuitry 1003 to interface between NAPT modules 1007 and PCP proxy module 1008. When executed by processing circuitry 1003, application modules 1010 direct circuitry 1003 to perform application functions like social networking, news and weather, media streaming, messaging, and the like.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to control Quality-of-Service (QoS) using Internet Protocol (IP) address ports, the method comprising:
 a wireless relay transferring a port request for a user application for delivery to a network controller;
 the network controller receiving the port request and responsively identifying an IP port range and a QoS level for the user application and generating and transferring port/QoS data that indicates the IP port range and the QoS level for the user application;
 the wireless relay receiving the port/QoS data for the user application;
 a network gateway receiving the port/QoS data for the user application;
 the wireless relay wirelessly exchanging user data for the user application with User Equipment (UE) using an IP port in the IP port range;
 the wireless relay exchanging the user data for the user application with the network gateway using the QoS level associated with the IP port range responsive to the use of the IP port by the UE;
 the network gateway exchanging the user data for the user application with a data network using the QoS level associated with the IP port range responsive to the use of the IP port.

2. The method of claim 1 wherein the wireless relay transferring the port request for the user application comprises the wireless relay receiving an IP flow having the IP port and responsively transferring the port request for the port range and the port/QoS data.

3. The method of claim 1 wherein the wireless relay transferring the port request for the user application comprises the wireless relay discovering the user application and responsively transferring the port request for the port range and the port/QoS data.

4. The method of claim 1 wherein:
the wireless relay transferring the port request for the user application comprises the wireless relay transferring a media type for the user application;
the network controller receiving the port request for the user application comprises the network controller receiving the media type for the user application; and
the network controller determining the QoS level for the user application comprises the network controller determining the QoS level for the media type.

5. The method of claim 1 wherein:
the wireless relay transferring the port request for the user application comprises the wireless relay transferring an application ID for the user application;
the network controller receiving the port request for the user application comprises the network controller receiving the application ID for the user application; and
the network controller determining the QoS level for the user application comprises the network controller determining the QoS level for the application ID.

6. The method of claim 1 further comprising the network controller selecting a Policy Charging Enforcement Function (PCEF) in the wireless relay for the user application and wherein transferring the port/QoS data comprises transferring the port/QoS data to the selected PCEF in the wireless relay.

7. The method of claim 1 further comprising the network controller selecting a Policy Charging Enforcement Function (PCEF) in the network gateway for the user application and wherein transferring the port/QoS data comprises transferring the port/QoS data to the selected PCEF in the network gateway.

8. The method of claim 1 further comprising:
the wireless relay generating and transferring relay usage metrics for the data exchange using the IP port responsive to the port/QoS data; and
the network gateway generating and transferring gateway usage metrics for the data exchange using the IP port responsive to the port/QoS data.

9. The method of claim 1 wherein:
the wireless relay transferring the port request for the user application for delivery to the network controller comprises the wireless relay generating and transferring a Port Control Protocol (PCP) request for delivery to a PCP server; and
the network controller receiving the port request and identifying the IP port range and the QoS level for the user application comprises the PCP server receiving the PCP request and identifying the IP port range and the QoS level for the user application responsive to the PCP request.

10. The method of claim 9 wherein the PCP server identifying the IP port range and the QoS level for the user application comprises the PCP server generating and transferring a network request for delivery to a Policy Charging Rules Function (PCRF) that determines the QoS level for the user application and the PCRF responding with the QoS level for the user application.

11. A wireless communication system to control Quality-of-Service (QoS) using Internet Protocol (IP) address ports, the method comprising:
a wireless relay configured to transfer a port request for a user application for delivery to a network controller;
the network controller configured to receive the port request and responsively identify an IP port range and a QoS level for the user application and generate and transfer port/QoS data that indicates the IP port range and the QoS level for the user application;
the wireless relay configured to receive the port/QoS data for the user application;
a network gateway configured to receive the port/QoS data for the user application;
the wireless relay configured to wirelessly exchange user data for the user application with User Equipment (UE) using an IP port in the IP port range and to exchange the user data for the user application with the network gateway using the QoS level associated with the IP port range responsive to the use of the IP port by the UE; and
the network gateway configured to exchange the user data for the user application with a data network using the QoS level associated with the IP port range responsive to the use of the IP port.

12. The wireless communication system of claim 11 wherein the wireless relay is configured to receive an IP flow having the IP port and responsively transfer the port request for the port range and the port/QoS data.

13. The wireless communication system of claim 11 wherein the wireless relay is configured to discover the user application and responsively transfer the port request for the port range and the port/QoS data.

14. The wireless communication system of claim 11 wherein:
the wireless relay is configured to transfer the port request indicating a media type for the user application; and
the network controller is configured to receive the port request indicating the media type for the user application and determine the QoS level for the user application by determining the QoS level for the media type.

15. The wireless communication system of claim 11 wherein:
the wireless relay is configured to transfer the port request indicating an application ID for the user application;
the network controller is configured to receive the port request indicating the application ID for the user application and determine the QoS level for the user application by determining the QoS level for the application ID.

16. The wireless communication system of claim 11 further comprising the network controller configured to select a Policy Charging Enforcement Function (PCEF) in the wireless relay for the user application and to transfer the port/QoS data to the selected PCEF in the wireless relay.

17. The wireless communication system of claim 11 further comprising the network controller configured to select a Policy Charging Enforcement Function (PCEF) in the network gateway for the user application and to transfer the port/QoS data comprises transferring the port/QoS data to the selected PCEF in the network gateway.

18. The wireless communication system of claim 11 further comprising:

the wireless relay configured to generate and transfer relay usage metrics for the data exchange using the IP port responsive to the port/QoS data; and the network gateway configured to generate and transfer gateway usage metrics for the data exchange using the IP port responsive to the port/QoS data.

19. The wireless communication system of claim 11 wherein the port request for the user application comprises a Port Control Protocol (PCP) request, and the network controller comprises a PCP server configured to identify the port range and the port/QoS data for the user application responsive to the PCP request.

20. The wireless communication system of claim 19 wherein the PCP server is configured to identify the IP port range and the QoS level for the user application by generating and transferring a network request for delivery to a Policy Charging Rules Function (PCRF) and the wireless communication system further comprising the PCRF configured to determine and respond with the QoS level for the user application.

* * * * *